United States Patent [19]

Mladjan et al.

[11] Patent Number: 5,694,202
[45] Date of Patent: Dec. 2, 1997

[54] UNIVERSAL BORESIGHT TOOL FOR SMALL ARMS WEAPONS

[75] Inventors: Gary J. Mladjan; Daryl R. Iossi, both of Torrance; Douglas A. Anderson, Long Beach, all of Calif.

[73] Assignee: Hughes Aircraft Company, Los Angeles, Calif.

[21] Appl. No.: 589,722

[22] Filed: Jan. 22, 1996

[51] Int. Cl.$^6$ .............................. G01C 3/08; F41G 1/00; G01B 11/26
[52] U.S. Cl. ................ 356/4.01; 89/41.17; 356/138; 356/154
[58] Field of Search .................. 356/152.2, 154, 356/138, 4.01; 89/41.17

[56] References Cited

U.S. PATENT DOCUMENTS

| | | |
|---|---|---|
| 3,464,770 | 9/1969 | Schmidt . |
| 4,422,758 | 12/1983 | Godfrey et al. . |
| 4,794,430 | 12/1988 | Whittaker et al. ............ 356/252 |
| 4,825,258 | 4/1989 | Whitson .......................... 356/153 |
| 5,118,186 | 6/1992 | Schratzenstaller ............ 356/153 |
| 5,272,514 | 12/1993 | Dor ................................. 356/251 |
| 5,432,598 | 7/1995 | Szatkowski ................... 356/153 |

*Primary Examiner*—Stephen C. Buczinski
*Attorney, Agent, or Firm*—Georgann S. Grunebach; Michael W. Sales; Wanda K. Denson-Low

[57] ABSTRACT

Boresighting apparatus that includes a multispectral reflective collimator combined with an adjustable rhomboid reflector that allows boresighting of any wavelength sighting, pointing, aiming or rangefinding device disposed on a small arms weapon. The boresighting apparatus comprises a housing and a small arms weapon adapter for securing the housing to small arms weapons having different calibers. An illuminated or heated target is disposed in the housing for selectively providing an image of an illuminated or heated target pattern. A power source is coupled to the target for providing power to selectively illuminate or heat the target. An adjustment mechanism is provided for incrementally adjusting the optical location of the target and thus the location of the target pattern. A mirror, such as an off-axis parabolic mirror, is disposed to reflect the image of the illuminated or heated target pattern along a visual optical path. A beamsplitter is disposed along the visual optical path for transmitting visible and infrared radiation, and for reflecting laser radiation derived from a laser rangefinder disposed along a laser optical path toward the target. A laser radiation filter is disposed along the visual optical path for preventing transmission of laser radiation to the eye of a user. A folding mirror is disposed along the laser optical path for reflecting the laser radiation derived from the laser rangefinder to the beamsplitter to superimpose the laser radiation on the target pattern.

12 Claims, 2 Drawing Sheets

UNIVERSAL BORESIGHT TOOL FOR SMALL ARMS WEAPONS

BACKGROUND

The present invention relates generally to boresighting apparatus, and more particularly, to an improved boresighting tool for small arms weapons.

Prior art visual boresighting tools include an XM-30 visual boresight collimator and an XM-30 infrared boresight collimator currently in the inventory of the U.S. Army. Each respective boresighting tool covers only one independent spectral band, and each is therefore limited in its capability. In addition, each respective boresighting tool does not have provisions for testing small arms weapons other than those sights to which they are specifically designed to be mounted. Thus, currently available visual boresighting tools are not flexible with regard to other small arms weapons, including yet undeveloped models.

Conventional boresighting tools that use non-visual boresighting techniques need to be fired using live rounds. Such non-visual boresighting tools also require mechanical clamping. Thus, currently available non-visual boresighting tools are somewhat cumbersome are require a shooting area in order to boresight the small arm.

Accordingly, it is an objective of the present invention to provide for improved boresighting apparatus for small arms weapons. It is a further objective of the present invention to provide for boresighting apparatus for small arms weapons that has multiple wavelength sighting capability.

SUMMARY OF THE INVENTION

To meet the above and other objectives, the present invention provides for an improved boresighting apparatus or tool that includes a multispectral reflective collimator combined with an adjustable rhomboid reflector that allows boresighting of any wavelength sighting, pointing, aiming or rangefinding device disposed on a small arms weapon. The present invention allows an individual to establish or confirm the boresight of a variety of sighting devices, aim lights, rangefinders and forward looking infrared devices (FLIRs) that are used with small arms weapons without a need to fire the weapon using live rounds.

The small arms weapon may comprises a thermal weapon sight and an infrared aiming light disposed along a visual optical path and a laser rangefinder disposed along a laser transmission path. More specifically, the boresighting apparatus comprises a housing and a small arms weapon adapter for securing the housing to small arms weapons having different calibers. An illuminated or heated target or reticle is disposed in the housing for selectively providing an image of an illuminated or heated target pattern. A power source is coupled to the illuminated or heated target or reticle for providing power thereto to selectively illuminate or heat the target or reticle.

An adjustment mechanism is provided for incrementally adjusting the optical location of the target or reticle and thus the location of the target pattern. A mirror, such as an off-axis parabolic mirror, for example, is disposed to reflect the image of the illuminated or heated target pattern along the visual optical path. A beamsplitter is disposed along the visual optical path for transmitting visible and infrared radiation along the visual transmission path and for reflecting laser radiation derived from the laser rangefinder disposed along the laser transmission path toward the target. A laser radiation filter is disposed along the visual transmission path for preventing transmission of laser radiation along the visual transmission path. A folding mirror is disposed along the laser transmission path for reflecting the laser radiation derived from the laser rangefinder along the laser transmission path to the beamsplitter to superimpose the laser radiation on the target pattern.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates a target pattern employed in the boresighting apparatus shown in FIGS. 1 and 2.

DETAILED DESCRIPTION

Figure 1:
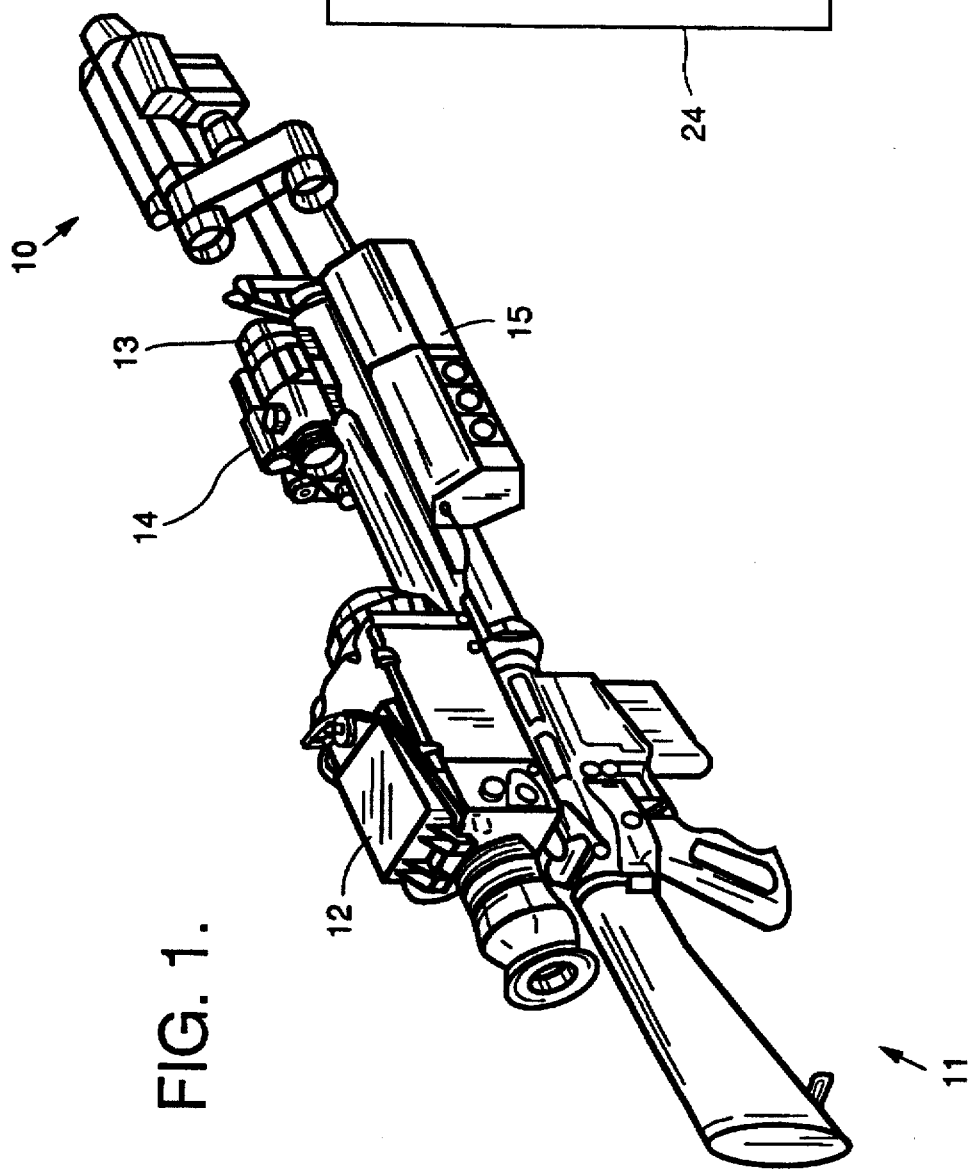
FIG. 1 is a perspective view of boresighting apparatus in accordance with the principles of thee present invention disposed on a small arms weapon.

Referring to the drawing FIGURES, FIG. 1 is a perspective view of boresighting apparatus 10 in accordance with the principles of the present invention disposed on a small arms weapon 11. The small arms weapon 11 may comprise any or all of the following devices 12–15 including a thermal weapon sight (TWS) 12, a close combat visual optic device 13, an infrared aiming light 14, or a laser rangefinder 15 employing a visible aiming light 15a, for example. The boresighting apparatus 10 is used to optically align each of the devices 12–15 and may be disposed on a variety of different small arms weapons 11 having different calibers.

Figure 2:
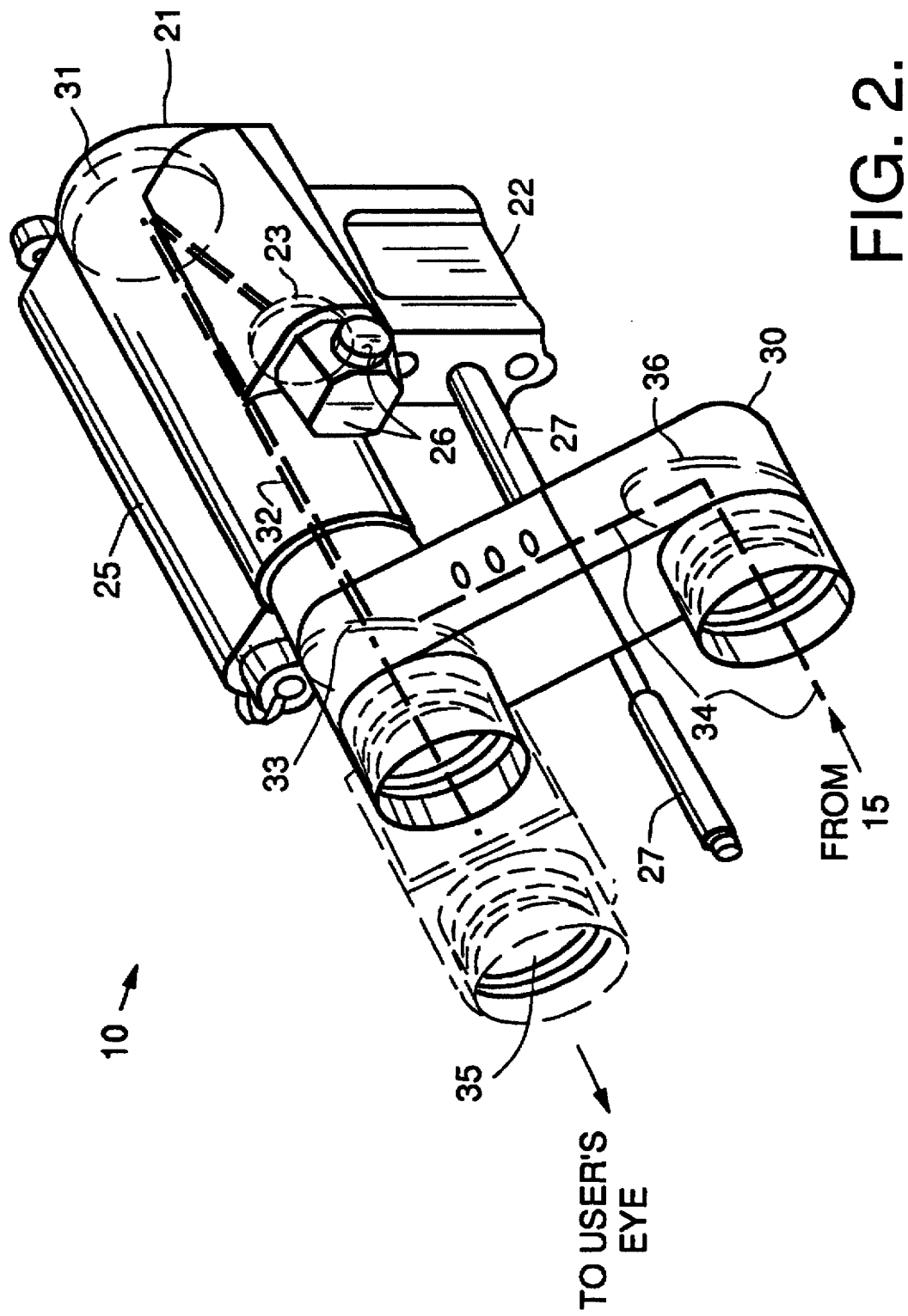
FIG. 2 illustrates an enlarged perspective view of the boresighting apparatus of FIG. 1.

Referring to FIG. 2, it is an enlarged perspective view of the boresighting apparatus of FIG. 1. The boresighting apparatus 10 comprises a housing 21 and a small arms weapon adapter 22 for securing the housing 21 to small arms weapons 11 having different calibers. The small arms weapon adapter 22 includes a plurality of different diameter mandrels 27 that are respectively sized to mount the boresighting apparatus 10 to a particular caliber weapon 11. The boresighting apparatus 10 includes a multispectral reflective collimator 20 combined with an adjustable rhomboid reflector 30 to provide boresighting capability for each of the devices 12–15 identified above.

An illuminated or heated target 23 or reticle 23 is disposed in the housing 21 for selectively providing an image of an illuminated or heated target pattern 24. FIG. 3 illustrates a typical target pattern 24 employed in the boresighting apparatus 10 of in FIGS. 1 and 2. A power source 25, such as a battery pack 25, for example, is coupled to the illuminated or heated target or reticle 23 for providing power thereto to selectively illuminate or heat the target or reticle 23 to produce the target pattern 24.

Adjustment means 26 are provided for incrementally adjusting the optical location of the target or reticle 23 and thus the illuminated or heated target pattern 24. Typical adjustment means 26 may include an X-Y positioning device, for example.

The multispectral reflective collimator 20 comprises an off-axis parabolic mirror 31 is disposed to reflect the image of the illuminated or heated target pattern 24 along a visual optical path 32. A beamsplitter 33 is disposed along the visual optical path 32 for transmitting visible and infrared radiation along the visual optical path 32 and for reflecting laser radiation derived from the laser range finder 15 disposed along a laser optical path 34 toward the target or reticle 23.

The adjustable rhomboid reflector 30 comprises a rhomboid or periscope assembly 30 is rotatably coupled to the housing 21, and comprises the laser optical path 34 and a folding mirror 36 which is used to transmit laser radiation from the laser rangefinder 15 along the laser optical path 34 to the beamsplitter 33 and thereafter along the visual optical path 32 toward the target pattern 24. The rotatable periscope assembly 30 has a center of rotation that is coincident with the visual transmission path. An optional laser radiation filter 35 is disposed along the visual optical path 32 in a removable filter housing 37 for preventing transmission or reflection of laser radiation along the visual optical path 32 to a user's eye. The folding mirror 36 is disposed along the laser optical path 34 and reflects the laser radiation derived from the laser rangefinder 15 along the laser optical path 34 to the beamsplitter 33 to superimpose the laser radiation on the target pattern 24.

The rhomboid or periscope assembly 30 is rotatable to permit its mating with laser rangefinders 15 disposed on different sized weapons 11. The laser filter is removable and is not used if the laser rangefinder 15 is not employed on the weapon 11.

In operation, the boresighting apparatus 10 is secured to the weapon 11 using the appropriate mandrel 27. The power source 25 is turned on to power the illuminated or heated target 23 or reticle 23. The rhomboid or periscope assembly 30 is rotated so that it is optically aligned with the laser rangefinder 15 so that laser radiation and light from the visible aiming light 15a are transmitted along the laser and visual optical paths 34, 32 so that it is made incident upon the target 23 or reticle 23 and hence is superimposed and made visible on the target pattern 24. Crosshairs contained in the thermal weapon sight 12, close combat visual optic device 13, or infrared aiming light 14 are respectively adjusted to superimpose them on the target pattern 24. The visible aiming light 15a is also adjusted to superimpose it on the target pattern 24, thus appropriately adjusting the laser radiation path. Appropriate adjustment of the various crosshairs are made in a routine manner.

Thus, an improved boresighting tool for use with small arms weapons has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. Boresighting apparatus for a small arms weapon comprising:

a housing;

means for securing the housing to small arms weapons having different calibers;

a target disposed in the housing for providing an image of a target pattern for viewing by a user;

a power source coupled to the target for providing power thereto to generate the target pattern;

adjustment means for incrementally adjusting the optical location of the target;

a mirror disposed to reflect the image of the target pattern along a visual optical path for viewing by the user;

a beamsplitter disposed along the visual optical path for transmitting visible and infrared radiation along the visual optical path and for reflecting laser radiation derived from a laser transmission path along a path coincident with the visual optical path;

a laser radiation filter disposed along the visual transmission path for preventing transmission of laser radiation along the visual transmission path to an eye of the user;

a folding mirror disposed along the laser transmission path for reflecting the laser radiation along the laser transmission path to the beamsplitter to superimpose the laser radiation on the target pattern.

2. The apparatus of claim 1 wherein the target comprises an illuminated or heated target.

3. The apparatus of claim 1 wherein the target comprises a heated target.

4. The apparatus of claim 1 wherein the mirror comprises an off-axis parabolic mirror.

5. The apparatus of claim 1 wherein the folding mirror and the laser transmission path comprise a rotatable periscope assembly, and wherein the rotatable periscope assembly has a center of rotation that is coincident with the visual transmission path.

6. The apparatus of claim 1 wherein the means for securing the housing to small arms weapons comprises a plurality of different diameter mandrels that are respectively sized to mount the boresighting apparatus to a particular caliber weapon.

7. Boresighting apparatus for a small arms weapon that comprises a thermal weapon sight and an infrared aiming light disposed along a visual optical path and a laser rangefinder disposed along a laser transmission path, said apparatus comprising:

a housing;

means for securing the housing to small arms weapons having different calibers;

a target disposed in the housing for providing an image of a target pattern;

a power source coupled to the target for providing power thereto to generate the target pattern;

adjustment means for incrementally adjusting the optical location of the target;

a mirror disposed to reflect the image of the target pattern along the visual optical path;

a beamsplitter disposed along the visual optical path for transmitting visible and infrared radiation along the visual optical path and for reflecting laser radiation derived from the laser rangefinder disposed along the laser optical path toward the target;

a laser radiation filter disposed along the visual optical path for preventing transmission of laser radiation along the visual optical path to a user's eye;

a folding mirror disposed along the laser optical path for reflecting the laser radiation derived from the laser rangefinder along the laser optical path to the beamsplitter to superimpose the laser radiation on the target pattern.

8. The apparatus of claim 7 wherein the target comprises an illuminated or heated target.

9. The apparatus of claim 7 wherein the target comprises a heated target.

10. The apparatus of claim 7 wherein the mirror comprises an off-axis parabolic mirror.

11. The apparatus of claim 7 wherein the folding mirror and the laser transmission path comprise a rotatable periscope assembly, and wherein the rotatable periscope assembly has a center of rotation that is coincident with the visual transmission path.

12. The apparatus of claim 7 wherein the means for securing the housing to small arms weapons comprises a plurality of different diameter mandrels that are respectively sized to mount the boresighting apparatus to a particular caliber weapon.

* * * * *